United States Patent
Yang et al.

(10) Patent No.: US 12,191,895 B2
(45) Date of Patent: Jan. 7, 2025

(54) BLUETOOTH TRANSMITTER, BLUETOOTH DEVICE, AND TRANSMITTER CAPABLE OF IMPROVING SUCCESS RATE OF BROADCAST OPERATION

(71) Applicant: Airoha Technology Corp., Hsinchu (TW)

(72) Inventors: Tzu-Kuan Yang, Hsinchu (TW); Yun-Xuan Zhang, Taipei (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 338 days.

(21) Appl. No.: 17/728,197

(22) Filed: Apr. 25, 2022

(65) Prior Publication Data
US 2023/0344453 A1 Oct. 26, 2023

(51) Int. Cl.
*H04B 1/04* (2006.01)
*H04B 1/00* (2006.01)

(52) U.S. Cl.
CPC ............ *H04B 1/04* (2013.01); *H04B 1/0096* (2013.01); *H04B 2001/0491* (2013.01)

(58) Field of Classification Search
CPC . H04B 1/04; H04B 1/0096; H04B 2001/0491
See application file for complete search history.

(56) References Cited

U.S. PATENT DOCUMENTS

| 11,240,089 | B2 | 2/2022 | Nayebi et al. | |
| 2006/0256910 | A1* | 11/2006 | Tal | H04B 1/71635 375/135 |
| 2012/0328061 | A1 | 12/2012 | Chow | |
| 2015/0171897 | A1 | 6/2015 | Premakanthan et al. | |
| 2017/0171791 | A1* | 6/2017 | Li | H04W 36/06 |
| 2018/0123617 | A1* | 5/2018 | Huang | H04B 1/0475 |

(Continued)

FOREIGN PATENT DOCUMENTS

TW 202213966 A 4/2022

OTHER PUBLICATIONS

TIPO Office Action dated Dec. 7, 2022 in Taiwan application No. 111116200.

*Primary Examiner* — Ernest G Tacsik
(74) *Attorney, Agent, or Firm* — McClure, Qualey & Rodack, LLP

(57) ABSTRACT

A Bluetooth transmitter, a Bluetooth device, and a transmitter are provided. After being received by the transmitter, a transmission bitstream is modulated to generate a first-path modulated signal and a second-path modulated signal, which are up-converted to a first first-path up-converted signal, a second first-path up-converted signal, a first second-path up-converted signal, and a second second-path up-converted signal. The first first-path and the second first-path up-converted signals are corresponding to a first broadcast channel, and the first second-path and the second second-path up-converted signals correspond to a second broadcast channel. A first-path baseband signal is generated based on the first first-path and the second first-path up-converted signals, and a second-path baseband signal is generated based on the first second-path and the second second-path up-converted signals. A broadcast signal is generated based on the first-path and the second-path baseband signals.

20 Claims, 8 Drawing Sheets

(56) References Cited

U.S. PATENT DOCUMENTS

| | | | |
|---|---|---|---|
| 2018/0332545 A1* | 11/2018 | Sanduleanu | H03F 3/195 |
| 2019/0036557 A1* | 1/2019 | Ipenza | H04B 1/04 |
| 2020/0067549 A1* | 2/2020 | Raghavan | H04B 1/3833 |
| 2020/0112471 A1* | 4/2020 | Mehrpoo | H04B 1/04 |
| 2020/0274608 A1* | 8/2020 | Luo | H04L 27/2662 |
| 2022/0131506 A1* | 4/2022 | Venkitasubramani | H03F 1/3258 |
| 2022/0247433 A1* | 8/2022 | Perumana | H04B 17/345 |
| 2022/0329998 A1* | 10/2022 | Arunachalam | H04L 67/1044 |
| 2022/0398886 A1* | 12/2022 | Birnbaum | H04W 4/80 |
| 2023/0336196 A1* | 10/2023 | Deforge | H04B 1/04 |
| 2023/0387958 A1* | 11/2023 | Lindoff | H04B 1/403 |

\* cited by examiner

BLUETOOTH TRANSMITTER, BLUETOOTH DEVICE, AND TRANSMITTER CAPABLE OF IMPROVING SUCCESS RATE OF BROADCAST OPERATION

TECHNICAL FIELD

The disclosure relates in general to a Bluetooth transmitter, a Bluetooth device, and a transmitter, and more particularly to a Bluetooth transmitter, a Bluetooth device, and a transmitter capable of improving the success rate of broadcast operations.

BACKGROUND

Bluetooth wireless technology is a popular short-range technology used for data communication between electronic devices, and there are several versions of Bluetooth standard, including Bit Rate/Enhanced Data Rate (hereinafter, BR/EDR) and low energy (hereinafter, LE) technology. BR/EDR supports relatively high payloads, and LE is suitable for low-latency, fast connection, and smaller packets.

Operations of Bluetooth wireless technology in terms of a state machine can be described at least with the following states: broadcast state (hereinafter, broadcast) and connection state (hereinafter, connection). In the specification, broadcast operation between Bluetooth devices is concerned. The broadcast operation allows a Bluetooth device to broadcast its presence and establish connections with other Bluetooth devices. In practical applications, the broadcast operation might be applied to Bluetooth devices having different types of relationships, for example, between a master device and a slave device, between a partner device and an agent device, and so forth. Regardless of the roles of Bluetooth devices, the broadcast operation involves a broadcaster and a scanner. The broadcaster transmits broadcast packets through radio waves in the air, and the scanner receives the broadcast packets through radio waves in the air. However, once the environment has interferences, the broadcast operation might be affected.

SUMMARY

The disclosure is directed to a Bluetooth transmitter, a Bluetooth device, and a transmitter capable of improving the success rate of broadcast operations.

According to one embodiment, a Bluetooth transmitter is provided. The Bluetooth transmitter includes a digital modulation module, a first up-conversion module, a second up-conversion module, a first-path digital-to-analog converter, a second-path digital-to-analog converter, and a radio frequency circuit. The digital modulation module modulates a transmission bitstream to generate a first-path modulated signal and a second-path modulated signal. The transmission bitstream carries a plurality of broadcast packets. The first up-conversion module is electrically connected to the digital modulation module. The first up-conversion module up-converts the first-path modulated signal to a first first-path up-converted signal and up-converts the second-path modulated signal to a first second-path up-converted signal. The first first-path up-converted signal and the first second-path up-converted signal correspond to a first broadcast channel. The second up-conversion module is electrically connected to the digital modulation module. The second up-conversion module up-converts the first-path modulated signal to a second first-path up-converted signal and up-converts the second-path modulated signal to a second second-path up-converted signal. The second first-path up-converted signal and the second second-path up-converted signal correspond to a second broadcast channel. The first-path digital-to-analog converter generates a first-path baseband signal based on the first first-path up-converted signal and the second first-path up-converted signal. The second-path digital-to-analog converter generates a second-path baseband signal based on the first second-path up-converted signal and the second second-path up-converted signal. The radio frequency circuit is electrically connected to the first-path digital-to-analog converter and the second-path digital-to-analog converter. The radio frequency circuit generates a broadcast signal based on the first-path baseband signal and the second-path baseband signal. The broadcast signal represents the plurality of broadcast packets to be transmitted in a plurality of intervals.

According to another embodiment, a Bluetooth device is provided. The Bluetooth device includes a controller and a Bluetooth transmitter. The controller and the Bluetooth transmitter are electrically connected together, and the controller generates the transmission bitstream.

According to an alternative embodiment, a transmitter is provided. The transmitter includes a digital modulation module, a first up-conversion module, a second up-conversion module, and a radio frequency circuit. The digital modulation module provides a packet. The first up-conversion module provides a first up-converted signal carrying a first replica of the packet, and the second up-conversion module provides a second up-converted signal carrying a second replica of the packet. Based on incorporation of the first up-converted signal and the second up-converted signal, the radio frequency circuit transmits an output signal carrying the first replica and the second replica of the packet.

Figure 1:
FIG. 1 is a schematic diagram illustrating broadcast operations performed in a Bluetooth wireless communication system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a schematic diagram illustrating broadcast operations performed in a Bluetooth wireless communication system. The wireless communication system 1 includes Bluetooth devices 11 and 13. The Bluetooth device 11 is a broadcaster, and the Bluetooth device 13 is a scanner.

Figure 2:
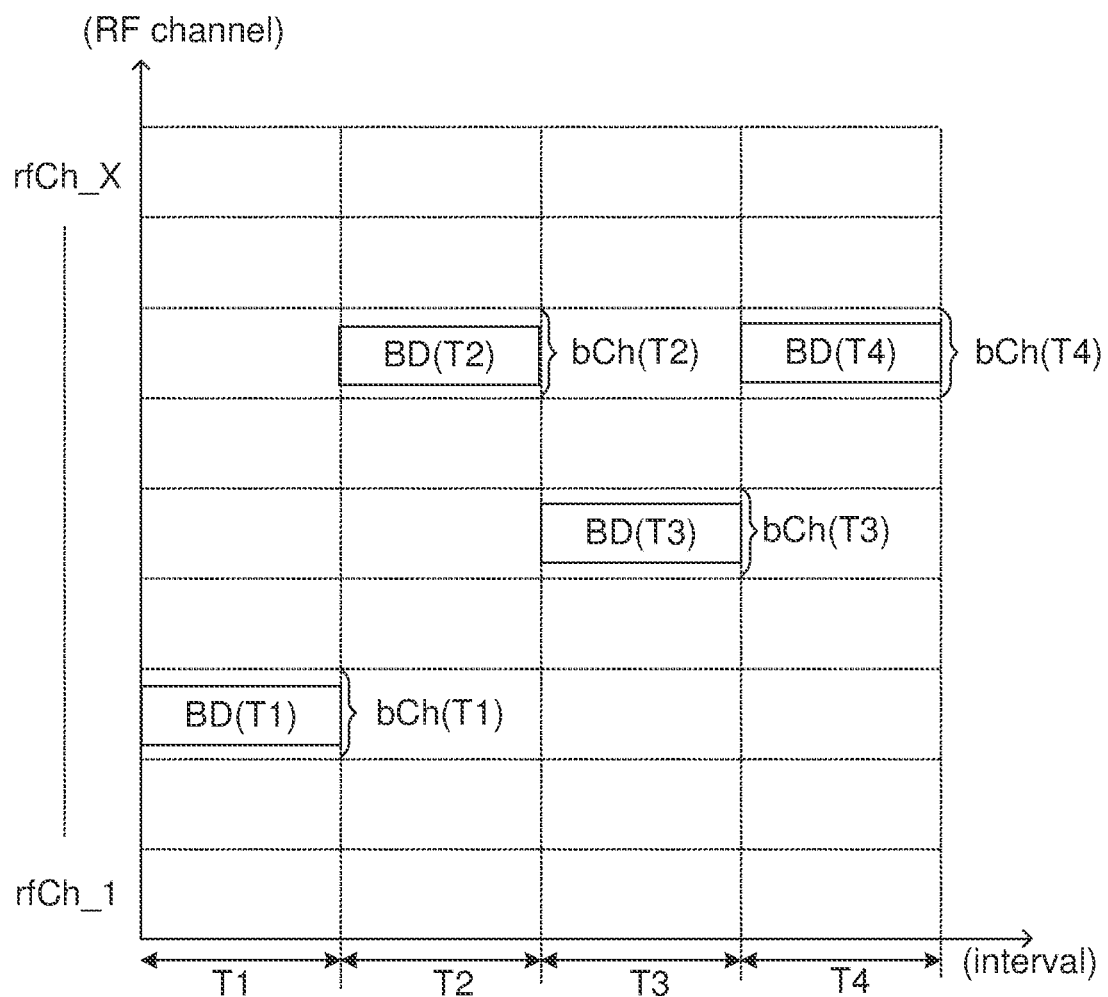
FIG. 2 is a schematic diagram illustrating that RF channels utilized as broadcast channels in different intervals are randomly selected for transmitting broadcast packets.

During the broadcast operation, the Bluetooth device 11 (broadcaster) transmits radio waves to the Bluetooth device 13 (scanner), wherein the radio waves are originated from a broadcast signal bcS carrying broadcast information BD. The broadcaster splits and encapsulates the broadcast information BD as broadcast packets, and the broadcast packets are transmitted in a unit of intervals. The interval may represent a time slot in BR/EDR or a time interval in LE. For the sake of illustration, a duration of a broadcast operation lasts for four continuous intervals T1, T2, T3, and T4 is illustrated example, as shown in FIG. 2. However, the length of the duration of the broadcast operation is not limited.

Bluetooth standard utilizes adaptive frequency hopping (hereinafter, AFH) for data transmission. Bluetooth standard divides frequency bands into smaller radio frequency (hereinafter, RF) channels and rapidly hops between the RF channels when transmitting the broadcast packets.

FIG. 2 is a schematic diagram illustrating that the RF channels utilized as broadcast channels in different intervals bCh(T1), bCh(T2), bCh(T3), bCh(T4) are randomly selected for transmitting broadcast packets. The horizontal axis represents RF channels rfCh_1 to rfCH_X defined in Bluetooth standard. X=79 for BR/EDR applications and X=40 for LE applications.

Please note that not all the RF channels can be utilized for broadcast operation, and the selection of the broadcast channels needs to follow the Bluetooth standard. In the specification, the RF channels being utilized for transmitting broadcast packets are defined as the broadcast channel(s).

Thus, the RF channel being selected for transmitting the broadcast packet BD(T1) in interval T1 is defined as a broadcast channel bCh(T1). The RF channel being selected for transmitting the broadcast packet BD(T2) in interval T2 is defined as a broadcast channel bCh(T2). The RF channel being selected for transmitting the broadcast packet BD(T3) in interval T3 is defined as a broadcast channel bCh(T3). The RF channel being selected for transmitting the broadcast packet BD(T4) in interval T4 is defined as a broadcast channel bCh(T4).

From intervals T1 to T4, the broadcaster sequentially broadcasts the broadcast packets BD(T1), BD(T2), BD(T3), and BD(T4) over the broadcast channels bCh(T1), bCh(T2), bCh(T3) and bCh(T4). The broadcast channels bCh(T1), bCh(T2), bCh(T3), and bCh(T4) are freely selected by the broadcaster. On the other hand, the scanner sequentially scans whether there are broadcast packets that can be found in the broadcast channels.

Figure 3:
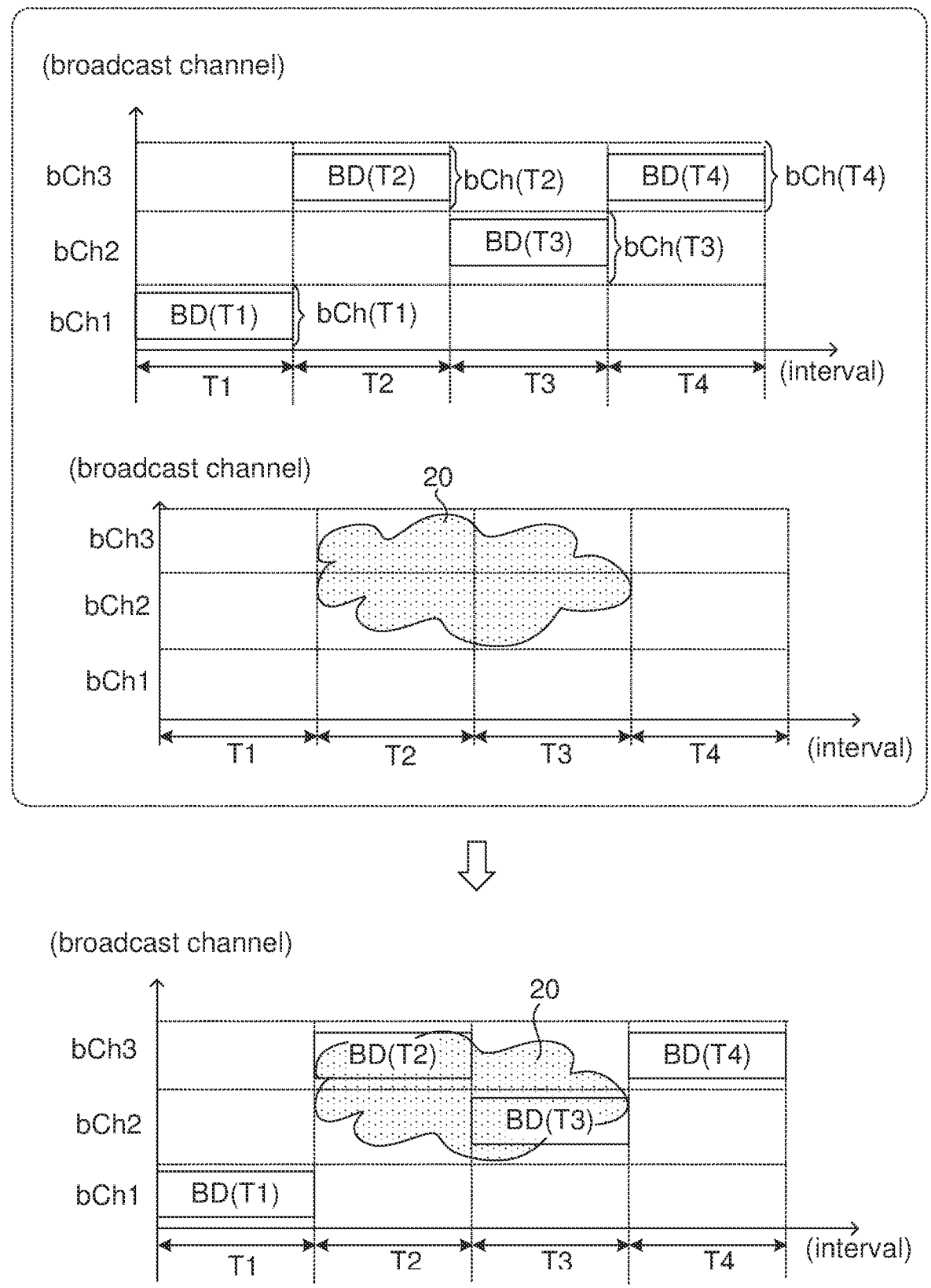
FIG. 3 is a schematic diagram illustrating that some of the broadcast packets are disturbed.

FIG. 3 is a schematic diagram illustrating that some of the broadcast packets are disturbed. Three figures are shown in FIG. 3. In these figures, the vertical axis represents the broadcast channels being selected during the broadcast operation, and the horizontal axis represents the interval (T). The broadcast channels being selected during the broadcast operation are arranged in the order of frequencies and numbered in ascending order.

The upper part in the dotted frame redraws and summarizes the relationship of the broadcast packets in intervals T1 to T4 in FIG. 2. Please refer to FIG. 2 and the topmost figure in FIG. 3 together. As the broadcast channel being selected for transmitting the broadcast packet BD(T1) corresponds to the lowest frequency, it is defined as a broadcast channel bCh1. As the broadcast channel being selected for transmitting the broadcast packets BD(T2) and BD(T4) corresponds to the highest frequency, it is defined as a broadcast channel bCh3. As the broadcast channel bCh(T3) being selected or transmitting the broadcast packet BD(T3) corresponds to a middle frequency, it is defined as a broadcast channel bCh2.

The middle part in the dotted frame represents the distribution of interference 20 in the air. The existence and the distribution of interference 20 are unknown to the broadcaster and the scanner, and interference 20 might cover several selected broadcast channels at different intervals.

The bottommost figure in FIG. 3 is a combination of the two figures in the dotted frame. It shows that interference 20 affects the broadcast operation. In interval T1, the broadcast packet BD(T1) can be successfully received at the selected broadcast channel bCh1(T1). However, interference 20 overlaps the broadcast channel bCh2 in intervals T2 and T3, and the broadcast packets BD(T2) and BD(T3) being transmitted in intervals T2 and T3 are damaged. Thus, the scanner cannot receive the broadcast packets BD(T2) and BD(T3). In interval T4, the broadcast packet BD(T4) can be successfully received at the selected broadcast channel bCh3. This implies that not all broadcast packets can be successfully received by the scanner.

To prevent broadcast packets from being disturbed in the environment, the present disclosure proposes a mechanism to create several replicas (copies) of the broadcast packets BD(T1), BD(T2), BD(T3), and BD(T4). Moreover, the replicas of each of the broadcast packets BD(T1), BD(T2), BD(T3), and BD(T4) are individually and concurrently transmitted at different broadcast channels. A variable M is utilized to represent the number of replicas of broadcast packets, and M is a positive integer greater than 1 (M>1).

Instead of selecting only one broadcast channel in each interval, the broadcaster, according to the embodiment of the present disclosure, selects M broadcast channels in each interval. In some embodiments, M broadcast channels are simultaneously selected in at least one interval. The broadcast channels bCh1 to bChM are selected based on the BR/EDR and/or LE specifications. Moreover, the broadcast channels being concurrently selected in the same interval are not necessary to be continuous RF channels.

At the M-selected broadcast channel bCh1 to bChM, the M replicas of the broadcast packets are simultaneously and individually transmitted. As there are M replicas of the broadcast packets in the air, the scanner has a better chance of successfully receiving any of the M replicas of the broadcast packets. Of course, the type of broadcast packet provided is merely an example and can be any type of packet for communication via Bluetooth, and the aspects herein are not limited by such example.

Figure 4:
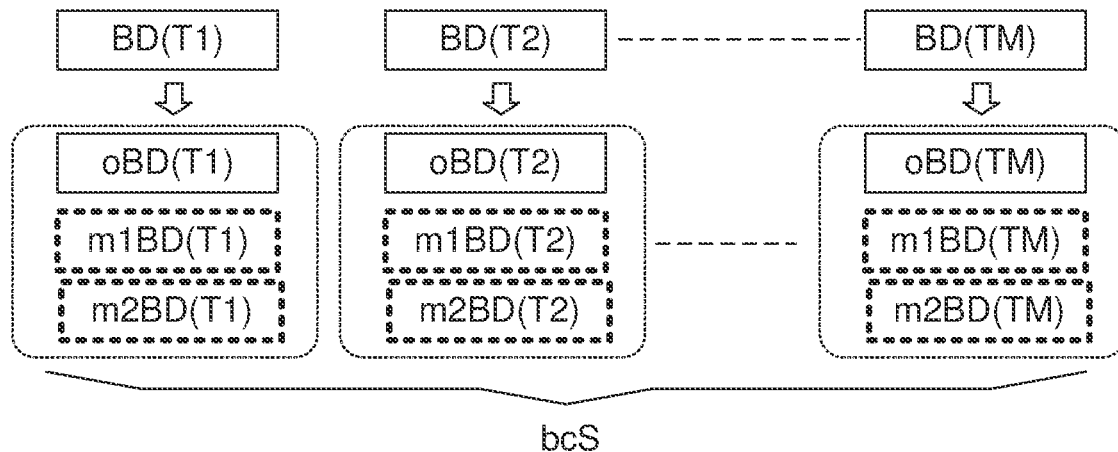
FIG. 4 is a schematic diagram illustrating that the broadcast packet is duplicated, and the replicas of the broadcast packets are transmitted concurrently.

FIG. 4 is a schematic diagram illustrating that broadcast packets are duplicated, and the replicas of broadcast packets are combined for transmission. The broadcast packet BD(T1) corresponding to interval T1 has M=3 replicas. The content of the replicas of the broadcast packet BD(T1) is substantially identical to each other. The three replicas of the broadcast packet BD(T1) are defined as an original broadcast packet oBD(T1) and two mirrored broadcast packets m1BD(T1) and m2BD(T1).

Similarly, the broadcast packets BD(T2), BD(T3), and BD(T4) corresponding to intervals T2, T3, and T4 are duplicated with M=3 replicas. The original broadcast packet, such as oBD(T1), oBD(T2), oBD(T3), and oBD(T4), are shown with solid frames. The two mirrored broadcast packets other than the original broadcast packet, such as broadcast packets m1BD(T1) and m2BD(T1) in interval T1, broadcast packets m1BD(T2) and m2BD(T2) in interval T2, broadcast packets m1BD(T3) and m2BD(T3) in interval T3, and broadcast packets m1BD(T4) and m2BD(T4) in interval T4, are shown with dotted frames.

Figure 5:
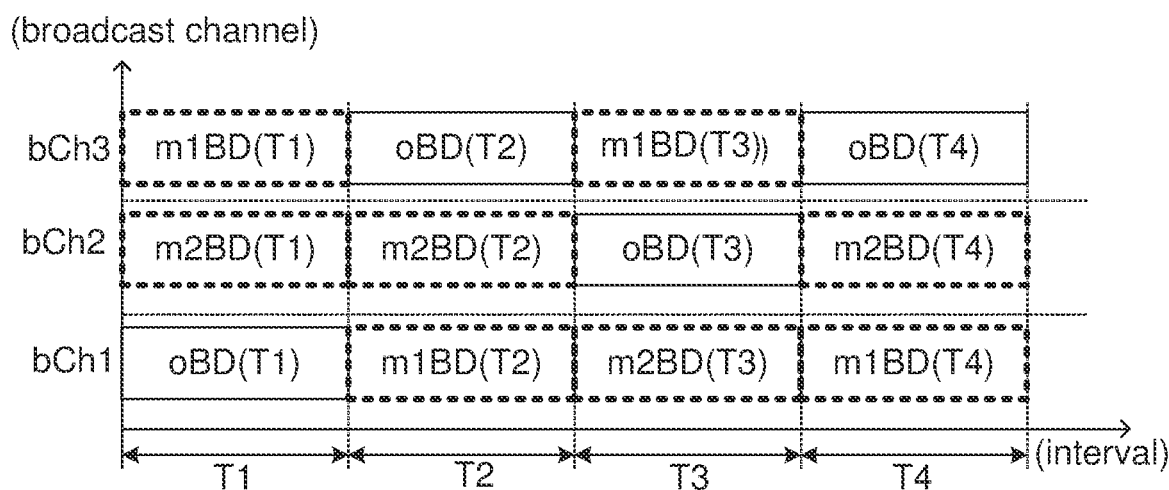
FIG. 5 is a schematic diagram illustrating an exemplary scheduling procedure in that the replicas of the broadcast packets are transmitted simultaneously in each interval.

The broadcast signal bcS corresponds to the M replicas of broadcast packets to be sent from a broadcaster to a scanner in each interval. FIG. 5 is a schematic diagram illustrating an exemplary scheduling procedure in which those replicas of broadcast packets are transmitted simultaneously in each interval T1 to T4.

Please refer to FIGS. 3 and 5 together. For the sake of illustration, the original broadcast packets oBD(T1), oBD(T2), oBD(T3), and oBD(T4) in FIG. 5 are transmitted through broadcast channels identical to those in FIG. 3. On the other hand, the mirrored broadcast packets m1BD(T1), m2BD(T1), m1BD(T2), m2BD(T2), m1BD(T3), m2BD(T3), m1BD(T4) and m2BD(T4) are transmitted through the broadcast channels different from those in FIG. 3.

For example, the broadcast channel bCh1 in interval T1 (represented as bCh1(T1)) is utilized to transmit the original broadcast packet oBD(T1), the broadcast channel bCh2 in interval T1 (represented as bCh2(T1)) is utilized to transmit the mirrored broadcast packet m2BD(T1), and the broadcast channel bCh3 in interval T1 (represented as bCh3(T1)) is utilized to transmit the mirrored broadcast packet m1BD(T1). Illustrations related to the broadcast channels (bCh1, bCh2, and bCh3) in intervals T1 to T4 (bCh1(T1) to bCh1(T4), bCh2(T1) to bCh2(T4), bCh3(T1) to bCh3(T4)), original/mirrored broadcast packets oBD(T1) to oBD(T4), m1BD(T1) to m1BD(T4), and m2BD(T1) to m2BD(T4), and intervals T1 to T4 are omitted but summarized in Table 1.

TABLE 1

| | | interval | | | |
|---|---|---|---|---|---|
| | | T1 | T2 | T3 | T4 |
| broadcast channels being concurrently selected | bCh1 | original broadcast packet oBD(T1) | mirrored broadcast packet m1BD(T2) | mirrored broadcast packet m2BD(T3) | mirrored broadcast packet m1BD(T4) |
| | bCh2 | mirrored broadcast packet m2BD(T1) | mirrored broadcast packet m2BD(T2) | original broadcast packet oBD(T3) | mirrored broadcast packet m2BD(T4) |
| | bCh3 | mirrored broadcast packet m1BD(T1) | original broadcast packet oBD(T2) | mirrored broadcast packet m1BD(T3) | original broadcast packet oBD(T4) |

Please note that, in FIG. 5, an RF channel corresponding to the same selected broadcast channel in different intervals may vary. Moreover, the broadcast channel labeled with the same numbering in different intervals is unnecessary to be the same RF channel. For example, the actual RF channel represented by the broadcast channel bCh1 corresponding to interval T1 (bCh1(T1)) can be different from the RF channel represented by the broadcast channel bCh1 corresponding to interval T2 (bCh1(T2)). That is, bCh1(T1)*bCh1(T2).

Depending on the version of the Bluetooth standard, the features of RF channels and which RF channels are available to be utilized for broadcasting are different. According to BR/EDR specification, 79 RF channels are defined, and each RF channel has a bandwidth of 1 MHz. Among the 79 RF channels defined in BR/EDR specification, either only odd RF channels or only even RF channels are utilized for broadcasting. According to LE specification, 40 RF channels are defined, and each RF channel has a bandwidth of 2 MHz. Among the 40 RF channels defined in LE specification, RF channels #37, #38, and #39 are utilized for broadcasting.

Figure 6:
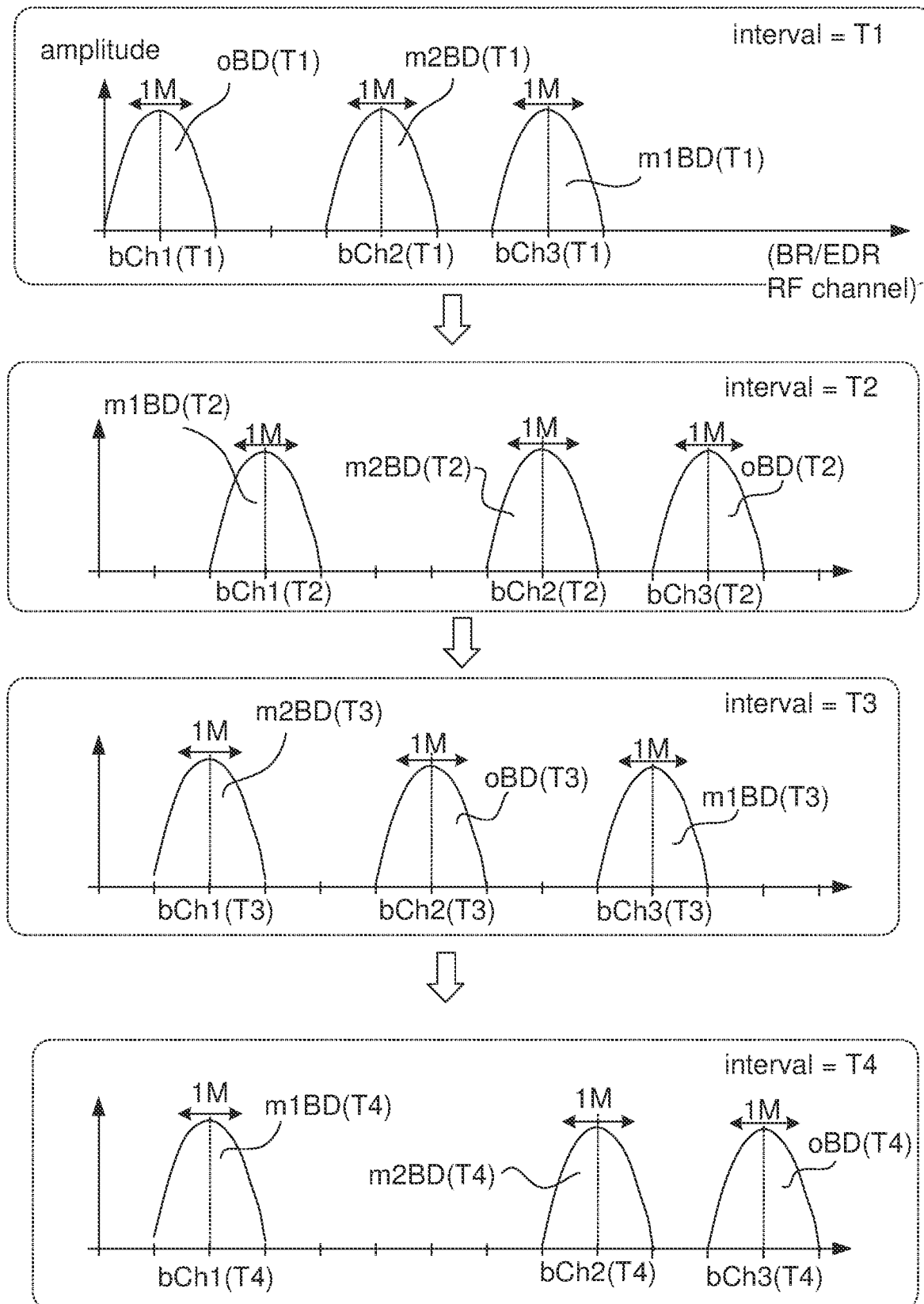
FIG. 6 is a schematic diagram illustrating that the RF channels utilized as broadcast channels in different intervals for transmitting replicas of the broadcast packets are randomly selected based on the Bluetooth BR/EDR scheme.

FIG. 6 is a schematic diagram illustrating that the channels utilized as broadcast channels bCh1, bCh2, and bCh3 in different intervals T1, T2, T3, and T4 for transmitting replica broadcast packets are randomly defined based on the Bluetooth BR/EDR scheme. In FIG. 6, the vertical axis represents the amplitude of signals, and the horizontal axis represents RF channels defined in BR/EDR specification. Moreover, center frequencies corresponding to the broadcast channels bCh1(T1) to bCh1(T4), bCh2(T1) to bCh2(T4), and bCh3(T1) to bCh3(T4) are labeled with dotted vertical lines. Please note that mapping between the replicas of broadcast packets (including the original/mirrored broadcast packets), the broadcast channels bCh1(T1) to bCh1(T4), bCh2(T1) to bCh2(T4), and bCh3(T1) to bCh3(T4), and the intervals T1 to T4 in Table 1 and FIGS. 5 and 6 correspond to each other.

The topmost dotted frame corresponds to the distribution of the broadcast channels being selected in interval T1, represented as bCh1(T1), bCh2(T1), and bCh3(T1). The second dotted frame corresponds to the distribution of the broadcast channels being selected in interval T2, represented as bCh1(T2), bCh2(T2), and bCh3(T2). The third dotted frame corresponds to the distribution of the broadcast channels being selected in interval T3, represented as bCh1(T3), bCh2(T3), and bCh3(T3). The bottommost dotted frame corresponds to the distribution of the broadcast channels being selected in interval T4, represented as bCh1(T4), bCh2(T4), and bCh3(T4).

As shown in FIG. 6, the broadcast channel bCh1 in interval T1 (that is, bCh1 (T1)) corresponds to a lower RF channel, and the RF channel corresponding to the broadcast channel bCh1 in interval T2 (that is, bCh1 (T2)) is shifted rightward (toward high frequency). Moreover, the broadcast channels bCh1 in intervals T3 and T4 (that is, bCh1 (T3) and bCh1(T4)) correspond to an RF channel between those in intervals T1 and T2. Similarly, an RF channel corresponding to each broadcast channel bCh1, bCh2, and bCh3 is changed with different intervals T1 to T4.

As illustrated above, the broadcast channels bCh1, bCh2, and bCh3 selected for broadcast are freely determined in each interval T1 to T4, and their corresponding RF channels can be different in different intervals T1 to T4. In practical applications, an approach of pre-defining some of the RF channels and further selecting the broadcast channels from the predefined RF channels (for example, 5 of the 40 BR/EDR odd RF channels are pre-defined, and the M broadcast channels are selected from the 5 pre-defined RF channels) can be helpful to simplify the circuit design.

As Bluetooth LE specification already defines three primary broadcast channels (#37, #38, #39), mapping between a selected broadcast channel and an RF channel is not changed with different intervals. That is, the maximum value of M is three in the Bluetooth LE specification. Under the assumption that M=3, the broadcast channel bCh1 represents RF channel #37 in different intervals T1 to T4, the broadcast channel bCh2 represents RF channel #38 in different intervals T1 to T4, and the broadcast channel bCh3 represents RF channel #39 in different intervals T1 to T4.

Figure 7:
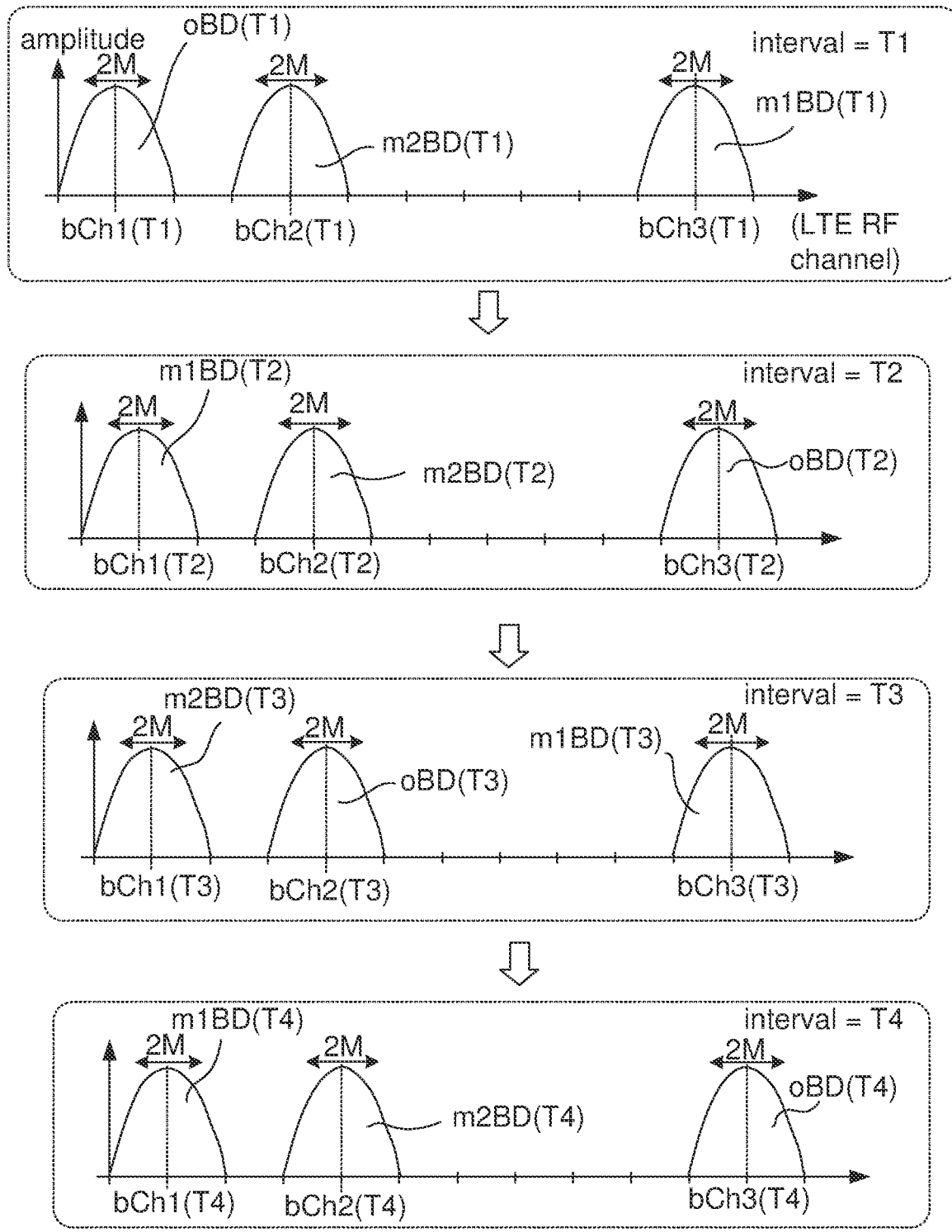
FIG. 7 is a schematic diagram illustrating that the RF channels utilized as broadcast channels in different intervals for transmitting replicas of the broadcast packets are kept unchanged based on the Bluetooth LE scheme.

FIG. 7 is a schematic diagram illustrating that the RF channels utilized as broadcast channels bCh1(T1) to bCh1(T4), bCh2(T1) to bCh2(T4), and bCh3(T1) to bCh3(T4) in different intervals T1, T2, T3, and T4 for transmitting replicas of the broadcast packets are kept unchanged based on Bluetooth LE scheme. In FIG. 7, the vertical axis represents the amplitude of signals, and the horizontal axis represents the RF channels defined in Bluetooth LE. Similarly, the center frequencies corresponding to the broadcast channels bCh1(T1) to bCh1(T4), bCh2(T1) to bCh2(T4), and bCh3(T1) to bCh3(T4) are labeled with dotted vertical lines. Please note that the mapping between the replicas of the broadcast packets (including the original/mirrored broadcast packets), the broadcast channels bCh1(T1) to bCh(T4), bCh2(T2) to bCh(T2), and bCh3(T1) to bCh3(T3), and the intervals T1 to T4 in Table 1 and FIGS. 5 and 7 correspond to each other.

The dotted frames from top to down respectively correspond to the distribution of the broadcast channels bCh1(T1), bCh2(T1), and bCh3(T1) in interval T1, the broadcast channels bCh1(T2), bCh2(T2), and bCh3(T2) in interval T2, the broadcast channels bCh1(T3), bCh2(T3), and bCh3(T3) in interval T3, and the broadcast channels bCh1(T4), bCh2(T4), and bCh3(T4) in interval T4. Unlike FIG. 6, the mappings between the RF channels and the broadcast channels bCh1(T1) to bCh1(T4), bCh2(T1) to bCh2(T4), and bCh3(T1) to bCh3(T4) are consistent in different intervals T1, T2, T3, and T4 in FIG. 7.

Figure 8:
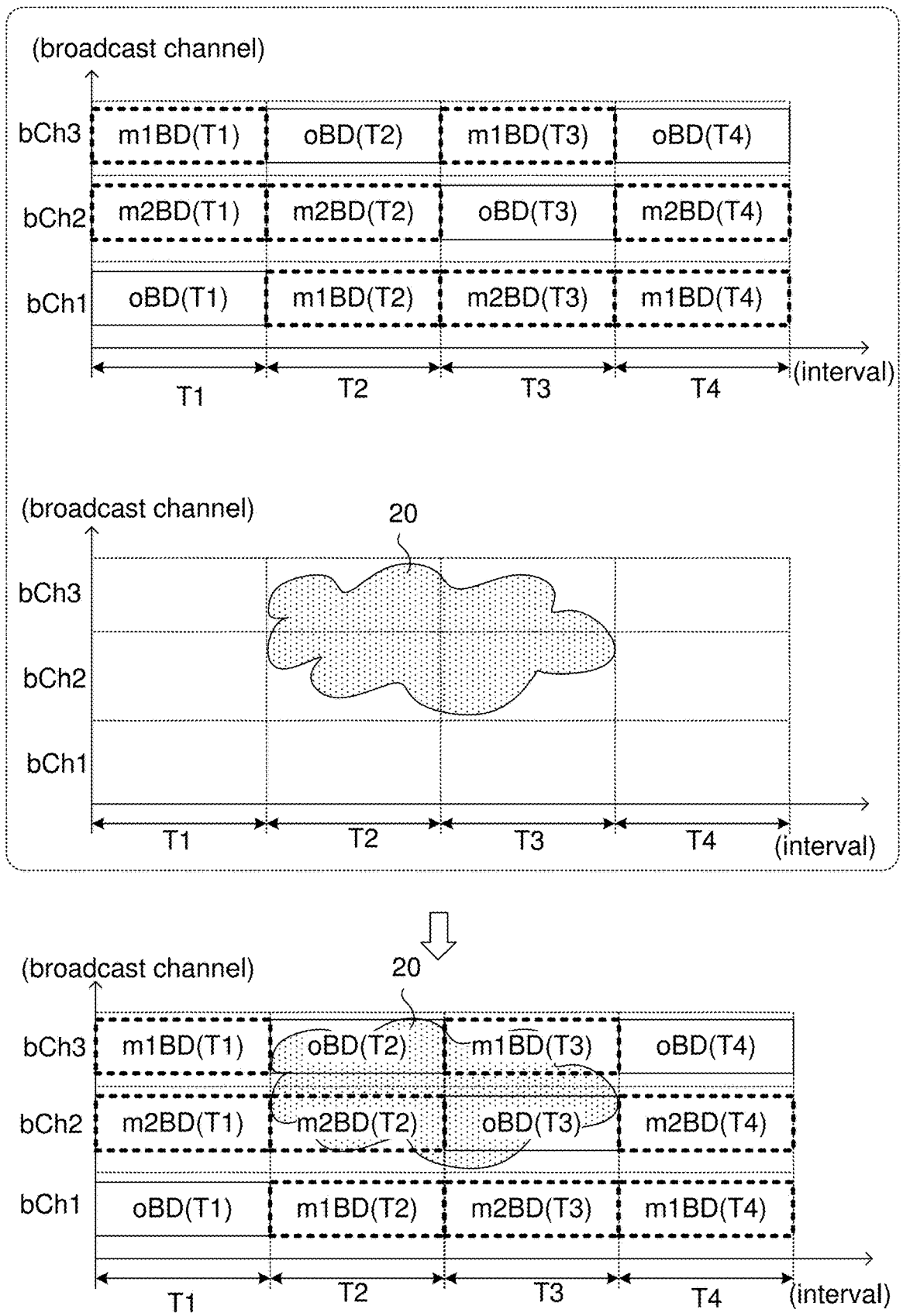
FIG. 8 is a schematic diagram illustrating that at least one of the replicas of the broadcast packets can still be successfully transmitted to the receiver in each interval, although the transmission path where the broadcast packets are transmitted is disturbed.

Although the RF channels available for broadcasting are different with different Bluetooth versions, the transmission method used for broadcasting data proposed in the specification can be applied to both Bluetooth standards. FIG. 8 demonstrates how the data transmission method provides better data quality.

FIG. 8 is a schematic diagram illustrating that at least one of the replicas of the broadcast packets can still be successfully transmitted to a receiver in each interval, although a transmission path where the broadcast packets are transmitted is disturbed. Please refer to FIGS. 3, 5, and 8 together. The upper figure and the lower figure in the dotted frame in FIG. 8 are respectively the same as FIG. 5 and the lower figure in the dotted frame in FIG. 3. Details of these two parts are not repetitively described. The bottommost figure in FIG. 8 is a combination of the two figures in the dotted frame. This figure can be interpreted together with the examples in FIGS. 6 and 7.

For the replicas of the broadcast packet BD(T1) in interval T1, the original broadcast packet oBD(T1) and the mirrored broadcast packets m1BD(T1) and m2BD(T1) can be successfully received because all the broadcast channels bCh1(T1), bCh2(T1), and bCh3(T1) in interval T1 are not disturbed.

For the replicas of the broadcast packet BD(T2) in interval T2, the mirrored broadcast packet m1BD(T2) can be successfully received at the broadcast channel bCh1(T2) because the broadcast channel bCh1 is not disturbed. On the other hand, the mirrored broadcast packet m2BD(T2) and the original broadcast packet oBD(T2) cannot be successfully received because the broadcast channels bCh2 and bCh3 are disturbed.

For the replicas of the broadcast packet BD(T3) in interval T3, the mirrored broadcast packets m2BD(T3) and m1BD(T3) can be successfully received through the broadcast channels bCh1 and bCh3 because the broadcast channels bCh3 and bCh1 are not disturbed. On the other hand, the original broadcast packet oBD(T3) cannot be successfully received because the broadcast channel bCh2 is disturbed.

For the replicas of the broadcast packet BD(T4) in interval T4, the mirrored broadcast packets m1BD(T1) and m2BD(T1) and the original broadcast packet oBD(T1) can be successfully received because all the broadcast channels bCh1, bCh2, and bCh3 in interval T4 are not disturbed.

Please refer to FIGS. 3 and 8 together. In FIG. 3, none of the broadcast packets BD(T2) and BD(T3) is received in intervals T2 and T3. In FIG. 8, the mirrored broadcast packet m1BD(T2) can still be received at the broadcast channel bCh1 in interval T2, and the mirrored broadcast packets m2BD(T3) and m1BD(T3) can still be received at the broadcast channels bCh1 and bCh3 in interval T3.

Figure 9:
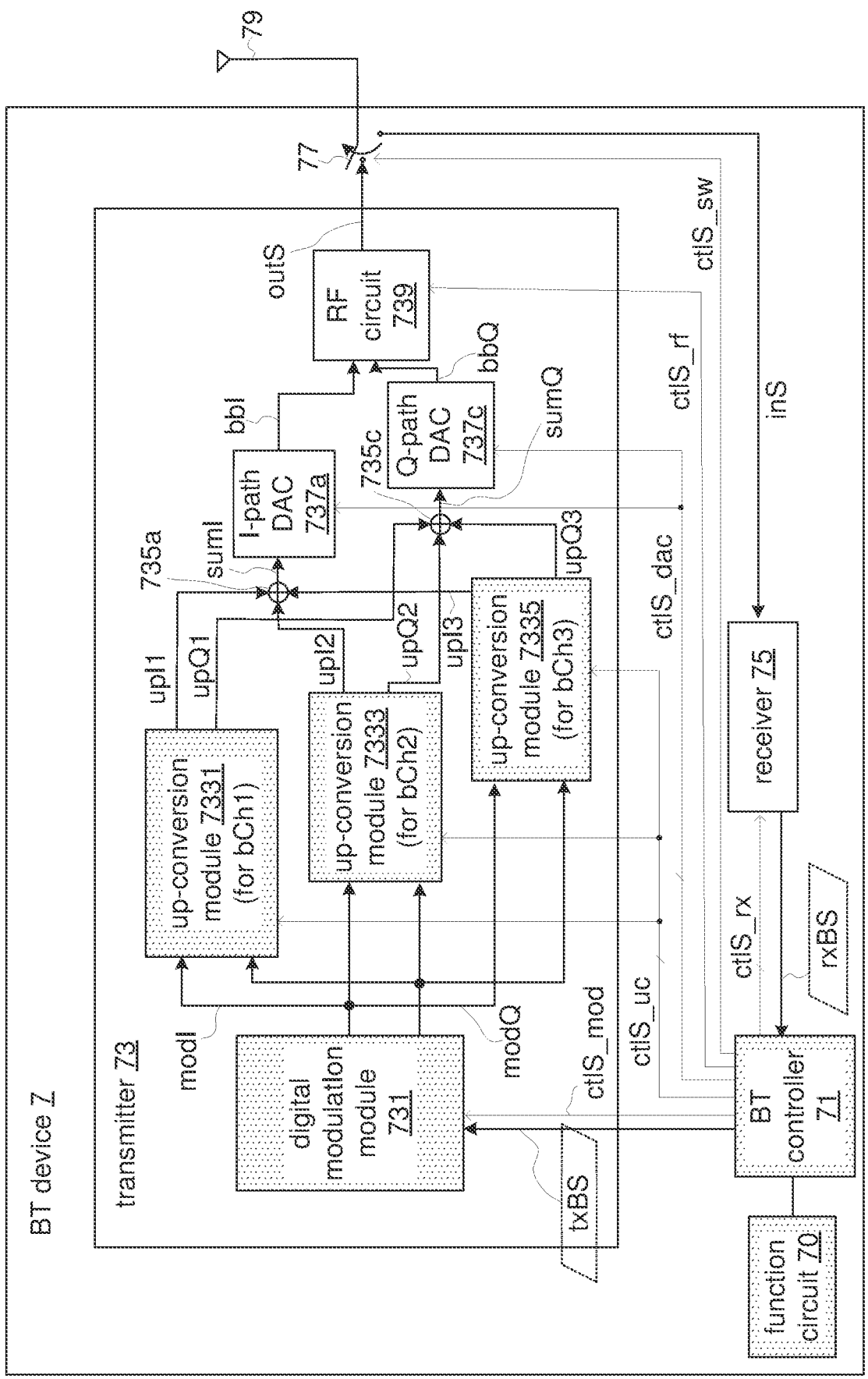
FIG. 9 is a block diagram illustrating the internal components of the Bluetooth device according to an embodiment of the present disclosure.

FIG. 9 is a block diagram illustrating the internal components of the Bluetooth device according to an embodiment of the present disclosure. A Bluetooth device 7 includes a function circuit 70, a Bluetooth controller 71, a transmitter 73, a receiver 75, a switch 77, and an antenna 79. The Bluetooth controller 71 is electrically connected to the function circuit 70, the transmitter 73, the receiver 75, and the switch 77. The function circuit 70 provides application functions such as mobile, earphones, speakers, and so forth. When function circuit 70 needs to activate the Bluetooth function, the function circuit 70 interacts with the Bluetooth controller 71. Besides, the transmitter 73 may support single-mode (BR/EDR or LE) or dual-mode (BR/EDR and LE).

The switch 77 is electrically connected to the antenna 79, and selectively electrically connected to the transmitter 73 and the receiver 75. The Bluetooth controller 71 sends a switching control signal ctlS_sw to the switch 77, to select which of the transmitter 73 and the receiver 73 is connected to the antenna 79.

The receiver 75 receives an input signal inS and transforms it to an input bitstream rxBS. The Bluetooth controller 71 transmits some receiver-related control signals ctlS_rx to the receiver 75. Details about the design and operations of the receiver 75 are not described.

The transmitter 73 includes a digital modulation module 731, up-conversion modules 7331, 7333, and 7335, summers 735a and 735c, an I-path digital-to-analog converter (hereinafter, DAC) 737a, a Q-path DAC 737c, and an RF circuit 739. As illustrated above, the selected broadcast channels bCh1, bCh2, and bCh3 are dynamically changed in different intervals (bCh1(T1) to bCh1(T4), bCh2(T1) to bCh2(T4), and bCh3(T1) to bCh3(T4)). This implies that the Bluetooth controller 71 needs to control the operations of transmitter 73 in an interval-based manner. Therefore, the Bluetooth controller 71 should dynamically generate control signals to the components in the transmitter 73. The Bluetooth controller 71 respectively transmits a modulation control signal ctlS_mod, up-conversion control signals ctlS_uc, digital-to-analog control signals ctlS_dac, and RF control signals ctlS_rf to the digital modulation module 731, the up-conversion modules 7331, 7333 and 7335, the I-path DAC 737a, the Q-path DAC 737c, and the RF circuit 739.

The digital modulation module 731 receives a transmission bitstream txBS from the Bluetooth controller 71. The transmission bitstream txBS carries the broadcast information BD to be transmitted to the scanner. Based on the transmission bitstream txBS, the digital modulation module 731 performs a Gaussian frequency-shift keying (hereinafter, GFSK) modulation on an I-path carrier signal and a Q-path carrier signal to generate an I-path modulated signal modI and a Q-path modulated signal modQ accordingly. The I-path carrier signal and a Q-path carrier signal have a phase shift of 90°. The I-path modulated signal modI and the Q-path modulated signal modQ are transmitted to the up-conversion modules 7331, 7333, and 7335.

In FIG. 9, it is assumed that the up-conversion modules 7331, 7333, and 7335, respectively, correspond to the broadcast channels bCh1, bCh2, and bCh3. The up-conversion module 7331 up-converts the I-path modulated signal modI and the Q-path modulated signal modQ to a pair of up-converted signals (including an I-path up-converted signal upI1 and a Q-path up-converted signal upQ1) corresponding to broadcast channel bCh1. The up-conversion module 7333 up-converts the I-path modulated signal modI and the Q-path modulated signal modQ to another pair of up-converted signals (including an I-path up-converted signal upI2 and a Q-path up-converted signal upQ2) corresponding to broadcast channel bCh2. The up-conversion module 7335 up-converts the I-path modulated signal modI and the Q-path modulated signal modQ to still another pair of up-converted signals (including an I-path up-converted signal upI3 and a Q-path up-converted signal upQ32) corresponding to broadcast channel bCh3.

The number of the up-conversion modules 7331, 7333, and 7335 is equal to the number of the selected broadcast channels (M) supported by the broadcaster. The specification assumes that the number of the selected broadcast channels is three (M=3). In practical application, M can be other positive integers, as long as it is smaller than or equivalent to the number of broadcast channels defined in Bluetooth specification. Therefore, the maximum number of up-conversion modules is 40 for Bluetooth BR/EDR applications or 3 for Bluetooth LE applications.

The I-path up-converted signals upI1, upI2, and upI3 are transmitted to the I-path summer 735a, and the Q-path up-converted signals upQ1, upQ2, and upQ3 are transmitted to the Q-path summer 735c. Then, the I-path summer 735a sums the I-path up-converted signals upI1, upI2, and upI3 to generate an I-path summer output sumI to the I-path DAC 737a. Similarly, the Q-path summer 735c sums the Q-path up-converted signals upQ1, upQ2, and upQ3 and generates a Q-path summer output sumQ to the Q-path DAC 737c.

Then, the I-path DAC 737a converts the I-path summer output sumI to an I-path baseband signal bbI, and the Q-path DAC 737c converts the Q-path summer output sumQ to a Q-path baseband signal bbQ. The I-path baseband signal bbI and the Q-path baseband signal bbQ are transmitted to the RF circuit 739 to generate an output signal outS. For broadcast operations, the output signal outS is directly utilized as the broadcast signal bcS. Then, the antenna 79 radiates radio waves in the air based on the output signal outS.

Figure 10:
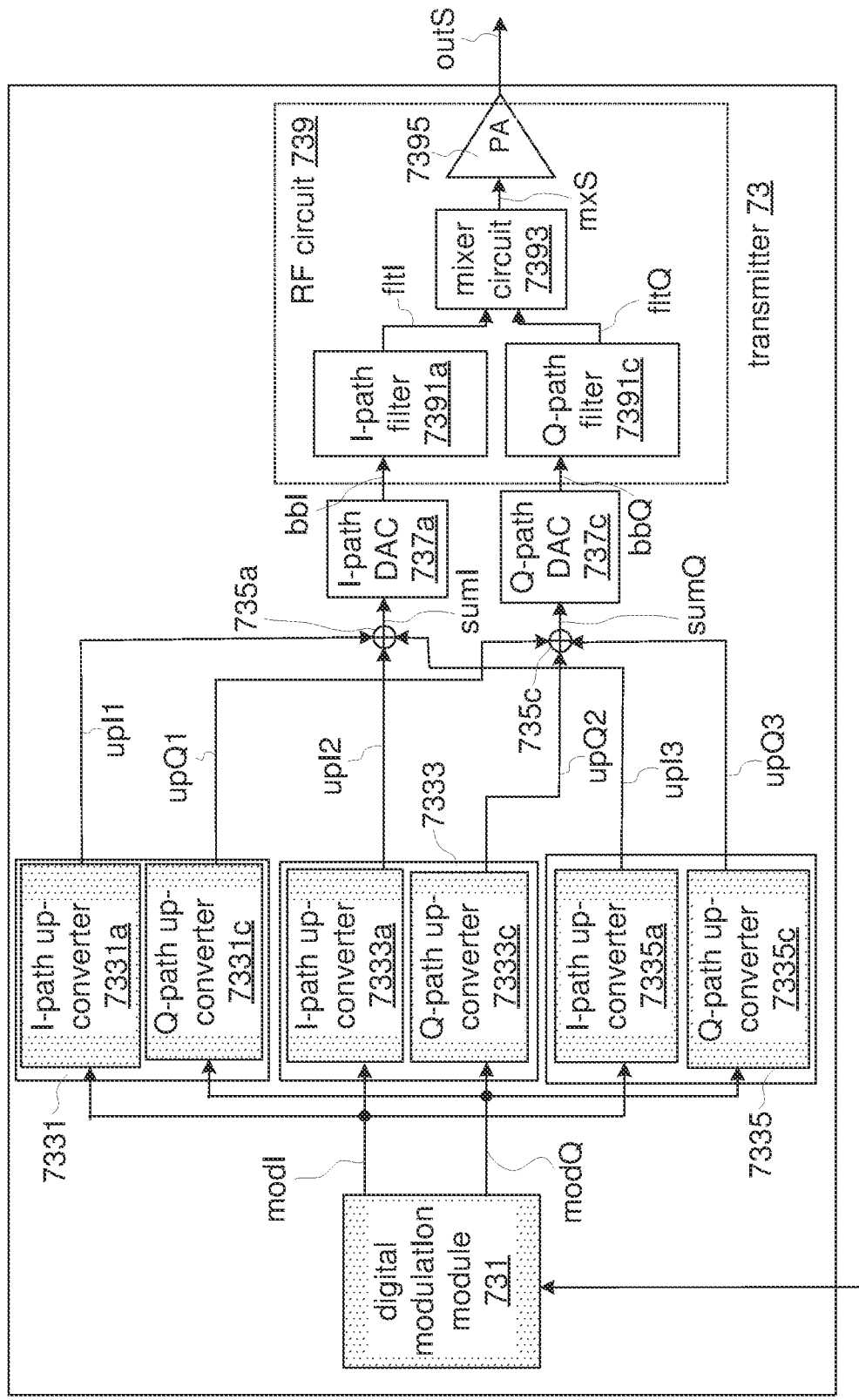
FIG. 10 is a block diagram illustrating the internal components of the transmitter according to an embodiment of the present disclosure.

FIG. 10 is a block diagram illustrating the internal components of the transmitter 73 according to an embodiment of the present disclosure. The internal components of the up-conversion modules 7331, 7333, and 7335, and the RF circuit 739 are further illustrated.

Each of the up-conversion modules 7331, 7333, and 7335 includes an up-converter corresponding to an I-path, and an up-converter corresponding to a Q-path. In the up-conversion module 7331, the I-path up-converter 7331a up-converts the I-path modulated signal modI to an I-path up-converted signal upI1, and the Q-path up-converter 7331c up-converts the Q-path modulated signal modQ to a Q-path up-converted signal upQ1. In the up-conversion module 7333, the I-path up-converter 7333a up-converts the I-path modulated signal modI to an I-path up-converted signal upI2, and the Q-path up-converter 7333c up-converts the Q-path modulated signal modQ to a Q-path up-converted signal upQ2. In the up-conversion module 7335, the I-path up-converter 7335a up-converts the I-path modulated signal modI to an I-path up-converted signal upI3, and the Q-path up-converter 7335c up-converts the Q-path modulated signal modQ to a Q-path up-converted signal upQ3.

The RF circuit 739 includes an I-path filter 7391a, a Q-path filter 7391c, a mixer circuit 7393, and a power amplifier 7395 (hereinafter, PA). The I-path filter 7391a receives the I-path baseband signal bbI from the I-path DAC 737a, and the Q-path filter 7391c receives the Q-path baseband signal bbQ from the Q-path DAC 737c. The I-path filter 7391a filters the I-path baseband signal bbI and generates an I-path filtered signal fltI, while the Q-path filter 7391c filters the Q-path baseband signal bbQ and generates a Q-path filtered signal fltQ.

The mixer circuit 7393 mixes the I-path filtered signal fltI with the Q-path filtered signal fltQ, and generates a mixed baseband signal mxS accordingly. The PA 7395 generates the output signal outS by increasing the signal power of the mixed baseband signal mxS.

In FIGS. 9 and 10, the components showing with dotted screen tone are implemented in digital circuits. It can be noticed that the modulation and the up-conversion are performed by digital circuits. Although the present disclosure adopts more selected broadcast channels for broadcast operation, the circuit complexity is not increased, and the area cost increases insignificantly because the modulation and the up-conversion are implemented with digital circuits.

By transmitting replicas of the broadcast packets through multiple selected channels, the success rate for the scanner to receive broadcast packets is enhanced because some of the broadcast channels might not be disturbed. For some Bluetooth applications, such as headphones, music can be played without interruption caused by packet loss.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A Bluetooth transmitter, comprising:
a digital modulation module, configured to modulate a transmission bitstream to generate a first-path modulated signal and a second-path modulated signal, wherein the transmission bitstream carries a plurality of broadcast packets;
a first up-conversion module, electrically connected to the digital modulation module, configured to up-convert the first-path modulated signal to a first first-path up-converted signal, and up-convert the second-path modulated signal to a first second-path up-converted signal, wherein the first first-path up-converted signal and the first second-path up-converted signal are corresponding to a first broadcast channel;
a second up-conversion module, electrically connected to the digital modulation module, configured to up-convert the first-path modulated signal to a second first-path up-converted signal, and up-convert the second-path modulated signal to a second second-path up-converted signal, wherein the second first-path up- converted signal and the second second-path up-converted signal are corresponding to a second broadcast channel;
a first-path digital-to-analog converter, configured to generate a first-path baseband signal based on the first first-path up-converted signal and the second first-path up-converted signal;
a second-path digital-to-analog converter, configured to generate a second-path baseband signal based on the first second-path up-converted signal and the second second-path up-converted signal; and
a radio frequency circuit, electrically connected to the first-path digital-to-analog converter and the second-path digital-to-analog converter, configured to generate a broadcast signal based on the first-path baseband signal and the second-path baseband signal, wherein the broadcast signal represents the plurality of broadcast packets to be transmitted in a plurality of intervals.

2. The Bluetooth transmitter according to claim 1, wherein the plurality of intervals comprises a first interval and a second interval, wherein
the first broadcast channel in the first interval corresponds to a first-first radio frequency,
the first broadcast channel in the second interval corresponds to a second-first radio frequency,
the second broadcast channel in the first interval corresponds to a first-second radio frequency, and
the second broadcast channel in the second interval corresponds to a second-second radio frequency.

3. The Bluetooth transmitter according to claim 2, wherein the plurality of broadcast packets comprises a first broadcast packet and a second broadcast packet, wherein
a replica of the first broadcast packet is transmitted through the first-first radio frequency and another replica of the first broadcast packet is transmitted by the first-second radio frequency, and
a replica of the second broadcast packet is transmitted through the second-first radio frequency, and another replica of the second broadcast packet is transmitted by the second-second radio frequency.

4. The Bluetooth transmitter according to claim 2, wherein
the first-first radio frequency is different from the first-second radio frequency, and
the second-first radio frequency is different from the second-second radio frequency.

5. The Bluetooth transmitter according to claim 2, wherein
the first-first radio frequency is different from the second-first radio frequency, and
the first-second radio frequency is different from the second-second radio frequency.

6. The Bluetooth transmitter according to claim 1, further comprises:
a first-path summer, electrically connected to the first up-conversion module and the second up-conversion module, configured to sum the first first-path up-converted signal and the second first-path up-converted signal and generate a first-path summer output; and
a second-path summer, electrically connected to the first up-conversion module and the second up-conversion module, configured to sum the first second-path up-converted signal and the second second-path up-converted signal and generate a second-path summer output.

7. The Bluetooth transmitter according to claim 6, wherein the first-path digital-to-analog converter converts the first-path summer output to the first-path baseband signal; and
the second-path digital-to-analog converter converts the second-path summer output to the second-path baseband signal.

8. The Bluetooth transmitter according to claim 1, further comprises:
a third up-conversion module, electrically connected to the digital modulation module, configured to up-convert the first-path modulated signal to a third first-path up-converted signal, and up-convert the second-path modulated signal to a third second-path up-converted signal, wherein
the third first-path up-converted signal and the third second-path up-converted signal are corresponding to a third broadcast channel.

9. The Bluetooth transmitter according to claim 8, wherein
the first-path digital-to-analog converter generates the first-path baseband signal based on the first first-path up-converted signal, the second first-path up-converted signal, and the third first-path up-converted signal, and
the second-path digital-to-analog converter generates the second-path baseband signal based on the first second-path up-converted signal, the second second-path up-converted signal, and the third second-path up-converted signal.

10. The Bluetooth transmitter according to claim 8, wherein the plurality of intervals comprises a first interval and a second interval, wherein
the third broadcast channel in the first interval corresponds to a first-third radio frequency, and
the third broadcast channel in the second interval corresponds to a second-third radio frequency, wherein
the first-third radio frequency is different from the second-third radio frequency.

11. The Bluetooth transmitter according to claim 1, wherein the radio frequency circuit comprises:
a first-path filter, electrically connected to the first-path digital-to-analog converter, configured to filter the first-path baseband signal and generate a first-path filtered signal accordingly; and
a second-path filter, electrically connected to the second-path digital-to-analog converter, configured to filter the second-path baseband signal and generate a second-path filtered signal accordingly.

12. The Bluetooth transmitter according to claim 11, wherein the radio frequency circuit further comprises:
a mixer circuit, electrically connected to the first-path filter and the second-path filter, configured to mix the first-path filtered signal and the second-path filtered signal and generate a mixed baseband signal accordingly.

13. The Bluetooth transmitter according to claim 12, wherein the radio frequency circuit further comprises:
a power amplifier, electrically connected to the mixer circuit, configured to increase power of the mixed baseband signal and output the broadcast signal accordingly.

14. The Bluetooth transmitter according to claim 13, wherein the broadcast signal is propagated to an antenna, and the antenna radiates radio waves in air based on the broadcast signal.

15. The Bluetooth transmitter according to claim 1, wherein the first broadcast channel and the second broadcast channel are selected from odd radio frequency channels or even radio frequency channels defined by Bluetooth Bit Rate/Enhanced Data Rate (hereinafter, BR/EDR) specification.

16. The Bluetooth transmitter according to claim 1, wherein the first broadcast channel and the second broadcast channel are selected from three primary broadcast channels defined by Bluetooth low energy (hereinafter, LE) specification.

17. The Bluetooth transmitter according to claim 1, wherein
   the digital modulation module applies a Gaussian frequency-shift keying (GFSK) modulation to the transmission bitstream,
   the first-path modulated signal is an in-phase modulated signal, and
   the second-path modulated signal is a quadrature-phase modulated signal.

18. A Bluetooth device, comprising:
   a controller, configured to generate a transmission bitstream; and
   a Bluetooth transmitter, electrically connected to the controller, comprising:
   a digital modulation module, configured to modulate a transmission bitstream to generate a first-path modulated signal and a second-path modulated signal, wherein the transmission bitstream carries a plurality of broadcast packets;
   a first up-conversion module, electrically connected to the digital modulation module, configured to up-convert the first-path modulated signal to a first first-path up-converted signal, and up-convert the second-path modulated signal to a first second-path up-converted signal, wherein the first first-path up-converted signal and the first second-path up-converted signal are corresponding to a first broadcast channel;
   a second up-conversion module, electrically connected to the digital modulation module, configured to up-convert the first-path modulated signal to a second first-path up-converted signal, and up-convert the second-path modulated signal to a second second-path up-converted signal, wherein the second first-path up-converted signal and the second second-path up-converted signal are corresponding to a second broadcast channel;
   a first-path digital-to-analog converter, configured to generate a first-path baseband signal based on the first first-path up-converted signal and the second first-path up-converted signal;
   a second-path digital-to-analog converter, configured to generate a second-path baseband signal based on the first second-path up-converted signal and the second second-path up-converted signal; and
   a radio frequency circuit, electrically connected to the first-path digital-to-analog converter and the second-path digital-to-analog converter, configured to generate a broadcast signal based on the first-path baseband signal and the second-path baseband signal, wherein the broadcast signal represents the plurality of broadcast packets to be transmitted in a plurality of intervals.

19. A transmitter, comprising:
   a digital modulation module, configured to provide a packet to one or more up-conversion modules;
   a first up-conversion module, configured to provide to a radio frequency circuit a first up-converted signal,
      wherein the first up-converted signal carries a first replica of the packet;
   a second up-conversion module, configured to provide to the radio frequency circuit a second up-converted signal,
      wherein the second up-converted carries a second replica of the packet; and
   wherein the radio frequency circuit is controlled to transmit an output signal carrying the first replica and the second replica of the packet based on incorporation of the first up-converted signal and the second up-converted signal on different channels, respectively, within a single interval.

20. The transmitter according to claim 19, wherein the radio frequency circuit comprises:
   a mixer, configured to generate a mixed baseband signal based on the incorporation of the first up-converted signal and the second up-converted signal; and
   a power amplifier, configured to transmit the output signal based on the mixed baseband signal.

\* \* \* \* \*